Patented Jan. 14, 1936

2,027,868

UNITED STATES PATENT OFFICE 2,027,868

METHOD OF TREATING STEEL MAKING SLAGS

Augustus B. Kinzel, Douglaston, N. Y., assignor to Electro Metallurgical Company, a corporation of West Virginia No Drawing. Application August 17, 1934
Serial No. 740,204

5 Claims. (Cl. 75—46)

The present invention relates to metallurgical slags, and more particularly to methods of treating steel melting slags to improve the characteristics thereof.

It is common practice in open hearth steel practice to add fluorspar to the molten bath in order to increase the fluidity of the slag. While the exact physico-chemical mechanism of this thinning process is not known, the effect of adding fluorspar is to increase the fluidity of the slag for a short time only after the addition, the slag gradually becoming thicker again, so that the net effect of the fluorspar addition is of a temporary nature.

Another disadvantage inherent in the addition of fluorspar to steel furnace slags is due to the marked "cutting" or destructive action of the slag thus treated upon the furnace lining.

An object of this invention is to thin the slag of open hearth steel furnaces in a permanent manner.

Another object of this invention is to prevent or minimize the destructive action of steel furnace slags upon the furnace lining.

These and other objects of this invention are accomplished in accordance with this invention by using a flux containing zirconia ($ZrO_2$) and/or titania ($TiO_2$) as addition material to open hearth furnace slags. In practicing one embodiment of this invention, three samples of ordinary open hearth steel furnace slag were used. Two pounds of each of the samples were melted in a magnesite-lined crucible and heated to the temperatures shown in the sub-joined table. The temperature in each case was selected to give slag of viscosity corresponding to that found in normal operation. The temperatures were measured with an optical pyrometer, suitable stirring and other precautions being taken. Following the temperature determination the slag was poured upon a steel plate inclined at an angle of 30°. The mean thickness of the resulting layer of slag was then measured to give an index of viscosity. The above procedure was then repeated, adding 5% and 10%, respectively, of zirconia ore of the following composition as determined by analysis:

$ZrO_2$: 73.8%; $SiO_2$: 19.48%; $TiO_2$: 0.61%; $Al_2O_3$: 2.30%; $Fe_2O_3$: 3.10%

Of the compounds mentioned above, all but $ZrO_2$ and $TiO_2$ are usually contained in open hearth steel slags.

As may be seen from the table below, the addition of zirconia ore has a very marked effect on the slag viscosity, and as little as 5% ore addition markedly thins the slag. This is true not only of the slags taken from the plain carbon steel heats at two stages of operation, but also of the slag taken from the chrome steel heat.

| Origin of slag | Slag remarks | Additions of zirconia ore | Temperature, degrees centigrade | Slag plate thickness | Fluidity |
|---|---|---|---|---|---|
| | | Percent | | Inches | |
| Pittsburgh steel | Plain 0.25% C bath. | None. | 1435 | ¼ | Fairly fluid. |
| Do | ----do---- | 5 | 1435 | ³⁄₁₆ | Fluid. |
| Do | ----do---- | 10 | 1435 | ⅛ | Very fluid. |
| Wheeling steel | Plain low C bath. | None. | 1460 | ¼ | Fairly fluid. |
| Do | ----do---- | 5 | 1427 | ³⁄₁₆ | Fluid. |
| Do | ----do---- | 10 | 1443 | ³⁄₁₆ | Do. |
| Pittsburgh crucible | Chrome steel ladle slag. | None. | 1505 | 1 | Viscous. |
| Do | ----do---- | 5 | 1509 | ⁵⁄₁₆ | Fairly fluid. |
| Do | ----do---- | 10 | 1513 | ⅛ | Very fluid. |

I claim:

1. Method of improving the working characteristics of basic open hearth steel slags which comprises adding to said slags a substantial proportion of zirconium oxide, whereby the fluidity of said slags is permanently increased to a considerable degree while at the same time their cutting action on the hearth and lining of the furnace is decreased.

2. Method of improving the working characteristics of basic open hearth steel slags which comprises adding to said slags a substantial proportion of zirconium oxide and titanium oxide, whereby the fluidity of said slags is permanently increased to a considerable degree while at the same time their cutting action on the hearth and lining of the furnace is decreased.

3. Method of improving the working characteristics of basic open hearth steel slags which comprises adding to said slags more than about 3% and less than about 10% of zirconium oxide in the form of mineral material containing essentially zirconium oxide, whereby the fluidity of said slags is permanently increased to a considerable degree while at the same time their cutting action on the hearth and lining of the furnace is decreased.

4. Method of improving the working characteristics of basic open hearth steel slags which comprises adding to said slags more than about 3% and less than about 10% of zirconium oxide and titanium oxide in the form of mineral material containing essentially zirconium oxide and titanium oxide, whereby the fluidity of such slags is permanently increased to a considerable degree while at the same time their cutting action on the hearth and lining of the furnace is decreased.

5. Method of improving the working characteristics of basic open hearth steel slag which comprises adding to said slag zirconia ore in the proportion of between about 5% and about 10% of the weight of the slag, whereby the fluidity of said slag is permanently increased to a considerable degree while at the same time its cutting action on the hearth and lining of the furnace is decreased.

AUGUSTUS B. KINZEL.